United States Patent
Veness et al.

(10) Patent No.: US 10,445,653 B1
(45) Date of Patent: Oct. 15, 2019

(54) EVALUATING REINFORCEMENT LEARNING POLICIES

(71) Applicant: DeepMind Technologies Limited, London (GB)

(72) Inventors: Joel William Veness, London (GB); Marc Gendron-Bellemare, London (GB)

(73) Assignee: DeepMind Technologies Limited, London (GB)

( * ) Notice: Subject to any disclaimer, the term of this patent is extended or adjusted under 35 U.S.C. 154(b) by 652 days.

(21) Appl. No.: 14/821,549

(22) Filed: Aug. 7, 2015

Related U.S. Application Data

(60) Provisional application No. 62/034,369, filed on Aug. 7, 2014.

(51) Int. Cl.
*G06N 20/00* (2019.01)
*G06N 5/02* (2006.01)

(52) U.S. Cl.
CPC ............. *G06N 20/00* (2019.01); *G06N 5/022* (2013.01)

(58) Field of Classification Search
None
See application file for complete search history.

(56) References Cited

U.S. PATENT DOCUMENTS

| 2007/0203871 A1* | 8/2007 | Tesauro | G06Q 10/06 706/53 |
| 2011/0016067 A1* | 1/2011 | Levchuk | G06Q 50/20 706/12 |

OTHER PUBLICATIONS

Bratko and Filipic, "Spam Filtering using Character-level Markov Models: Experiments for the TREC 2005 Spam Track," Proc. 14th Text Retrieval Conference (TREC 2005), Nov. 2005, 11 pages.

(Continued)

*Primary Examiner* — Kakali Chaki
*Assistant Examiner* — Michael Zidanic
(74) *Attorney, Agent, or Firm* — Fish & Richardson P.C.

(57) ABSTRACT

Methods, systems, and apparatus, including computer programs encoded on computer storage media, for evaluating reinforcement learning policies. One of the methods includes receiving a plurality of training histories for a reinforcement learning agent; determining a total reward for each training observation in the training histories; partitioning the training observations into a plurality of partitions; determining, for each partition and from the partitioned training observations, a probability that the reinforcement learning agent will receive the total reward for the partition if the reinforcement learning agent performs the action for the partition in response to receiving the current observation; determining, from the probabilities and for each total reward, a respective estimated value of performing each action in response to receiving the current observation; and selecting an action from the pre-determined set of actions from the estimated values in accordance with an action selection policy.

20 Claims, 4 Drawing Sheets

(56) References Cited

OTHER PUBLICATIONS

Cleary and Witten, "Data compression using adaptive coding and partial string matching," IEEE Trans. on Communications, 32(4):396-402, Apr. 1984.
Poupart and Boutilier, "Value-Directed Compression of POMDPs," Advances in Neural Information Processing Systems 15, pp. 1547-1554, 2002.
Veness et al., "Context Tree Switching," arXiv:1111.3182v1 [cs.IT], Nov. 2011, pp. 1-13.
Willems et al., "The Context-Tree Weighting Method: Basic Properties," IEEE Transactions on Information Theory, 41(3):653-664, May 1995.

* cited by examiner

EVALUATING REINFORCEMENT LEARNING POLICIES

CROSS-REFERENCE TO RELATED APPLICATION

This application claims priority to U.S. Provisional Application No. 62/034,369 filed on Aug. 7, 2014. The disclosure of the prior application is considered part of and is incorporated by reference in the disclosure of this application.

BACKGROUND

This specification relates to policy evaluation for a reinforcement learning agent.

Reinforcement learning agents interact with an environment by receiving an observation that characterizes the current state of the environment, and in response, performing an action from a pre-determined set of actions. Reinforcement learning agents generally receive rewards in response to performing the actions and select the action to be performed in response to receiving a given observation in accordance with a policy that includes rules for selecting actions in response to received observations.

SUMMARY

This specification describes technologies that relate to evaluating reinforcement learning policies by compressing received observations.

In general, one innovative aspect of the subject matter described in this specification can be embodied in methods that include the actions of receiving a plurality of training histories for a reinforcement learning agent interacting with an environment by performing one of a pre-determined set of actions in response to receiving an observation characterizing a state of the environment, wherein each training history is a sequence of time steps, and wherein, for each of the time steps, the training history comprises a respective training observation that characterizes a state of the environment at the time step and associates the training observation with an action performed by the reinforcement learning agent at the time step and a reward received by the reinforcement learning agent in response to performing the action; determining a total reward for each training observation in the training histories, wherein the total reward is a combination of rewards received by the reinforcement learning agent subsequent to performing the action at the time step corresponding to the training observation; partitioning the training observations into a plurality of partitions, each partition including training observations having the same total reward and being associated with the same action; receiving a current observation characterizing a current state of the environment; determining, for each partition and from the partitioned training observations, a probability that the reinforcement learning agent will receive the total reward for the partition if the reinforcement learning agent performs the action for the partition in response to receiving the current observation; determining, from the probabilities and for each total reward, a respective estimated value of performing each action in response to receiving the current observation; and selecting an action from the pre-determined set of actions from the estimated values in accordance with an action selection policy, the action selection policy including one or more rules for selecting between the actions in the pre-determined set of actions in response to a received observation.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. Values for possible action selections for a reinforcement learning agent can be efficiently and accurately estimated using probabilistic modeling rather than parameterized models. Using compression techniques to estimate the values allows value estimates to be generated efficiently and accurately, allowing for more powerful models and more computationally intensive action selection policies to be used. Reinforcement learning agents can respond to received observations by performing an action more effectively and can performance of the reinforcement learning agents can be improved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
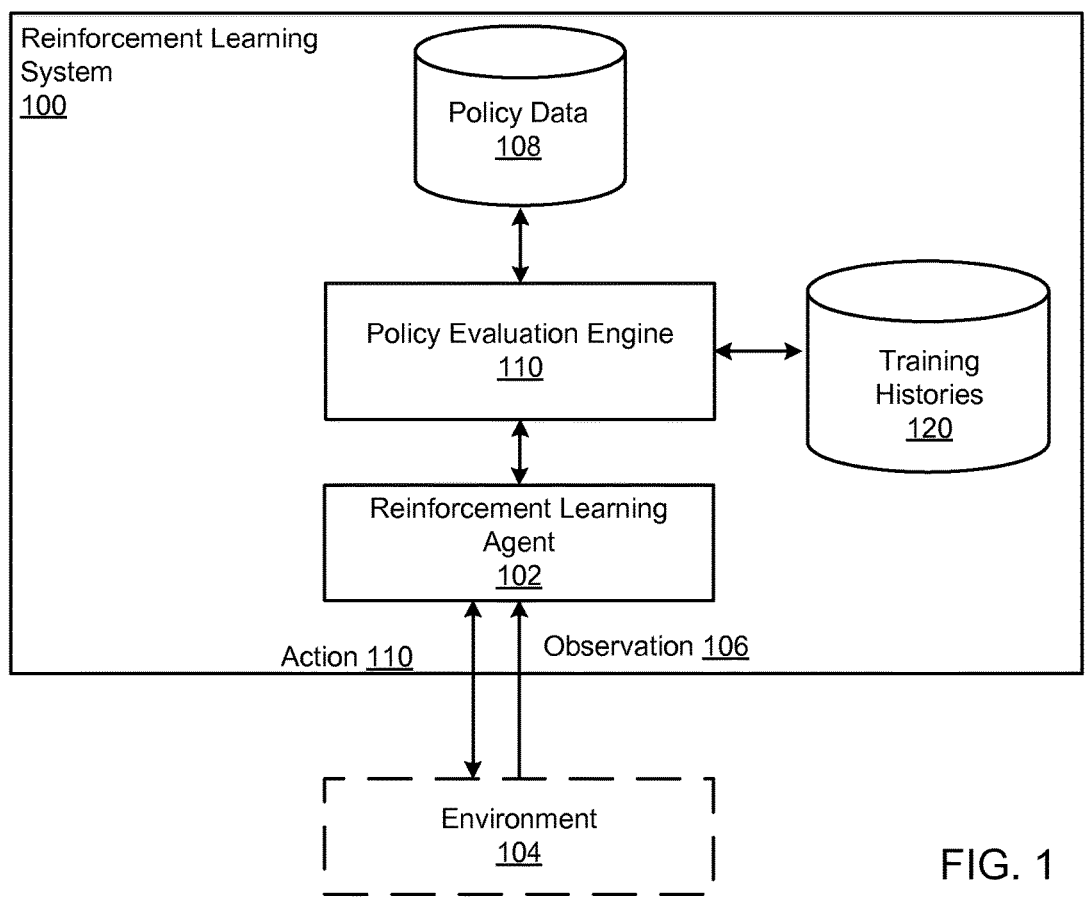
FIG. 1 shows an example reinforcement learning system.

FIG. 1 shows an example reinforcement learning system 100. The reinforcement learning system 100 is an example of a system implemented as computer programs on one or more computers in one or more locations, in which the systems, components, and techniques described below are implemented.

The reinforcement learning system 100 includes or can communicate with a reinforcement learning agent 102 that interacts with an environment 104. In particular, the reinforcement learning agent 102 receives observations and, in response to each observation, performs an action from a pre-determined set of actions. For example, the reinforcement learning agent 102 can receive an observation 106 and perform an action 110 in response to receiving the observation 106. Each observation received by the reinforcement learning agent 102 characterizes a state of the environment 104 and the action performed by the reinforcement learning 120 generally results in a change in the state of the environment. Subsequent to performing the action, the reinforcement learning agent 102 receives a reward that generally depends on the nature of the change in the state of the environment that resulted from the performed action.

For example, the reinforcement learning agent 102 can be one or more software programs in one or more locations that control the operation of a robot that interacts with the environment 104. For example, the environment 104 interacted with by the robot can be a video game, the observations received can characterize the current state of the video game, i.e., characterize the current display output of the video game, and the pre-determined set of actions can be game play controls selectable by the robot. As another example, the robot can be an autonomous vehicle, aircraft, or watercraft that navigates through an environment 104, e.g., a roadway, airspace, or a waterway. In this example, the received observations can characterize the current surroundings of the robot, and the pre-determined set of actions can be navigational controls for navigating the roadway, airspace, or waterway.

As another example, the environment 104 interacted with by the reinforcement learning agent 102 can be a digital environment. For example, the environment 104 can be an advertisement placement environment, the observations received by the reinforcement learning agent 102 can characterize one or more of an Internet resource in which an advertisement is going to be placed, a user to whom the Internet resource with the advertisement is going to be presented, or possible advertisements that can be selected for placement in the Internet resource, and the pre-determined set of actions can be the possible advertisements that can be selected for placement. As another example, the environment 104 interacted with by the reinforcement learning agent 102 can be a media content recommendation environment, the observations received by the reinforcement learning can characterize one or more of a current piece of content being viewed by a user, the user viewing the current piece of content or to whom the content is to be recommended, or the possible pieces of media content that can be recommended to the user, and the pre-determined set of actions can be the possible pieces of media content that can be recommended.

The reinforcement learning system 100 also includes a policy evaluation engine 110 that receives the current observation and selects the action to be performed by the reinforcement learning agent 102 in response to the current observation. The reinforcement learning system 100 then provides data identifying the selected action to the reinforcement learning agent 102 and the reinforcement learning agent 102 performs the selected action.

In particular, the policy evaluation engine 110 selects an action from the pre-determined set of actions by evaluating a policy stored in a policy evaluation repository 108 using the current observation and training histories from a training history repository 120. The policy includes rules for selecting between the actions in the pre-determined set of actions in response to a received observation. Each training history in the training history repository 120 is a sequence of time steps. For each time step in the sequence, the training history includes a training observation that describes the state of the environment 104 at the time step and associates each observation with a reward received by the reinforcement learning agent 102 at the time step, i.e., a reward that depends on the action performed by the reinforcement agent 102 at the preceding time step, and an action performed by the reinforcement learning agent 102 at the time step.

In general, the policy evaluation engine 110 partitions the training observations from the training histories and uses the partitioned training observations to select the action that will be performed by the reinforcement learning agent 102 when a new observation is received. Partitioning training observations is described below with reference to FIG. 2. Using partitioned training observations to select an action is described below with reference to FIGS. 3 and 4.

Figure 2:
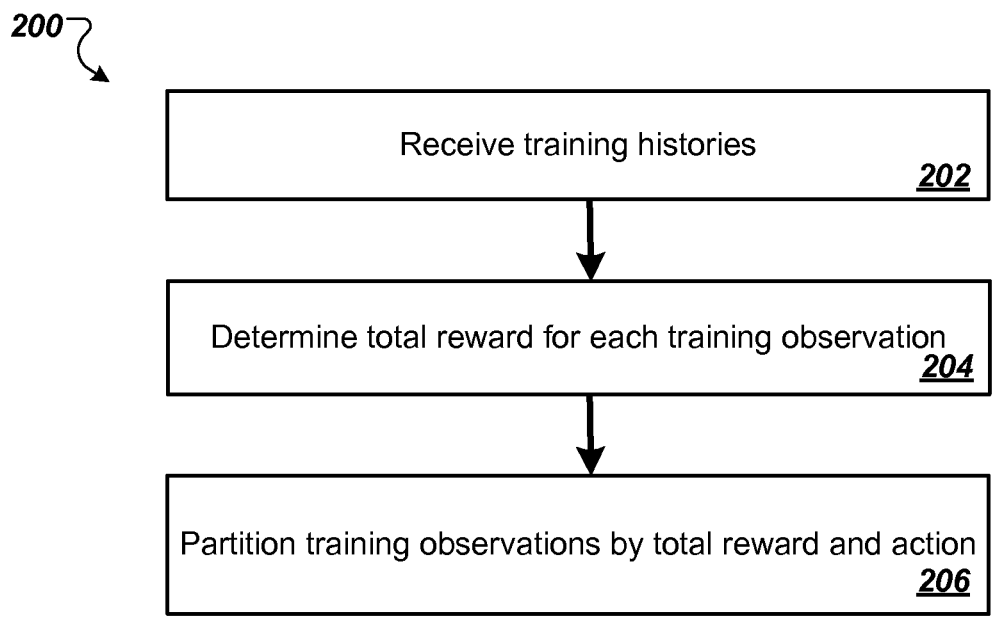
FIG. 2 is a flow diagram of an example process for partitioning training observations for a reinforcement learning agent.

FIG. 2 is a flow diagram of an example process 200 for partitioning training observations for a reinforcement learning agent. For convenience, the process 200 will be described as being performed by a system of one or more computers located in one or more locations. For example, a reinforcement learning system, e.g., the reinforcement learning system 100 of FIG. 1, appropriately programmed in accordance with this specification, can perform the process 200.

The system receives training histories for a reinforcement learning agent, e.g., training histories from a training history repository, e.g., the training history repository 120 of FIG. 1 (step 202). Each training history is a sequence of time steps. For each time step in the sequence, the training history includes a training observation that characterizes the state of an environment at the time step, an action performed at the time step, and associates each observation with a reward received in response to performing the action at the time step.

The system determines a total reward for each training observation in the training histories (step 204). The total reward for a training observation is a combination of the rewards received by the reinforcement learning agent subsequent to performing the action associated with the reward. That is, the system determines the total reward by combining the reward received at the same time step as the observation with the rewards received at each subsequent time step in the training history. Generally, the total reward is a sum of the rewards. If the training observation is the observation at the last time step in a training history, the total reward for the training observation is equal to the reward received at the time step.

The system partitions the training observations by total reward and action (step 206). That is, the system partitions the training observations so that each partition contains only training observations that are associated with the same total reward and the same action.

Figure 3:
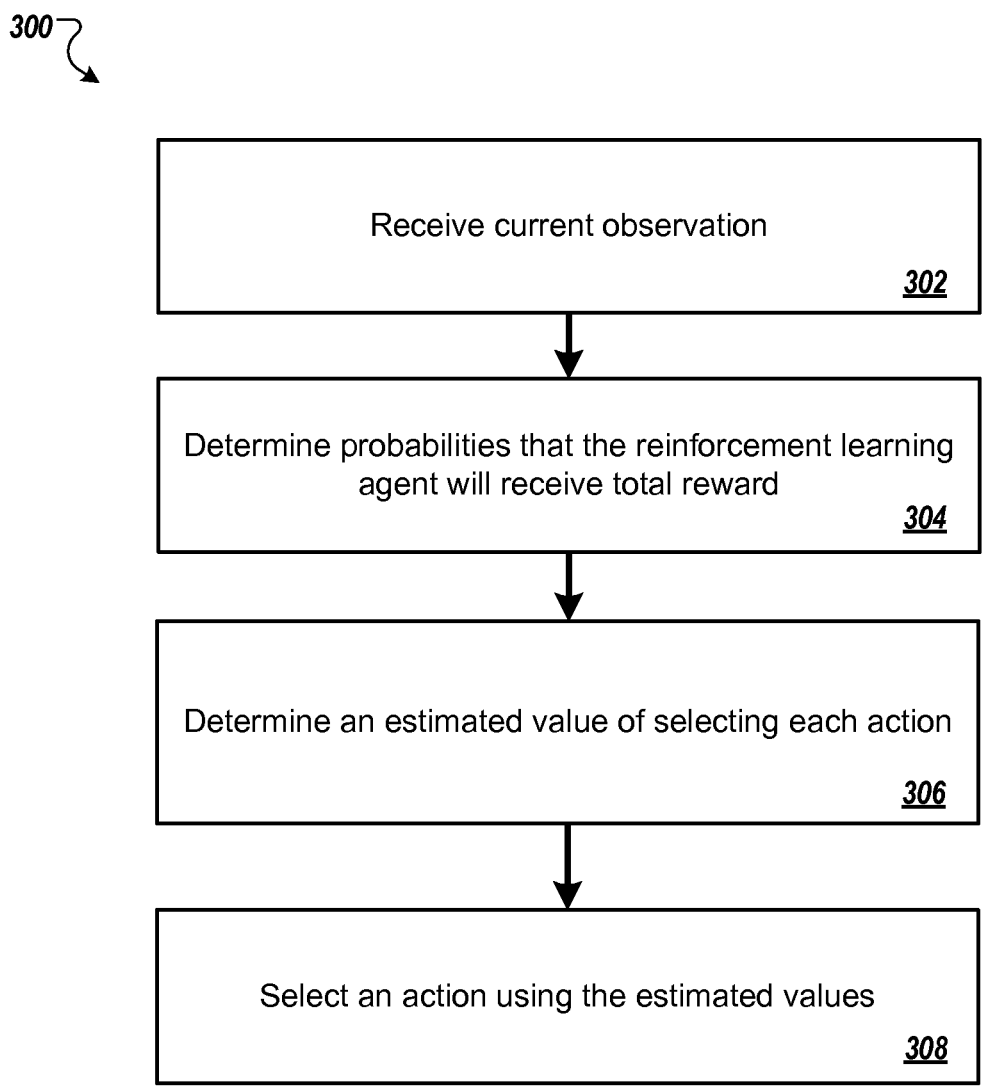
FIG. 3 is a flow diagram of an example process for selecting an action using partitioned training observations.

FIG. 3 is a flow diagram of an example process 300 for selecting an action using partitioned training observations. For convenience, the process 300 will be described as being performed by a system of one or more computers located in one or more locations. For example, a reinforcement learning system, e.g., the reinforcement learning system 100 of FIG. 1, appropriately programmed in accordance with this specification, can perform the process 200.

The system receives a current observation that characterizes a current state of an environment (step 302).

For each total reward—selected action combination that is associated with a partition, the system determines the probability that the reinforcement learning agent will receive the total reward if the reinforcement learning agent performs the action in response to the current observation (step 304). Determining the probability that the reinforcement learning agent will receive a given total reward if the reinforcement learning agent performs a given action in response to receiving the current observation is described below with reference to FIG. 4.

The system determines an estimated value of selecting each action in the pre-determined set of actions using the probabilities (step 306). In particular, the system determines an estimated value $\hat{V}_{t+1}(O_t, a_{t+1})$ for an action $a_{t+1}$ that satisfies:

$$\hat{V}_{t+1}(O_t, a_{t+1}) = \sum_R P(R \mid O_t; a_{t+1})R,$$

where the estimated value is a sum over the total rewards associated with the same partitions as the action $a_{t+1}$, R is a given total reward, and $P(R \mid O_t; a_{t+1})$ is the probability of receiving the given total reward if the reinforcement learning agent performs the action $a_{t+1}$ in response to receiving the current observation $O_t$.

The system selects an action using the estimated values in accordance with an action selection policy (step 308). For example, the action selection policy may specify that the system select the action that has the highest estimated value. As another example, the action selection policy may specify that the system select the action that has the highest estimated value with one probability and select an action randomly from the set of actions with another probability.

Figure 4:
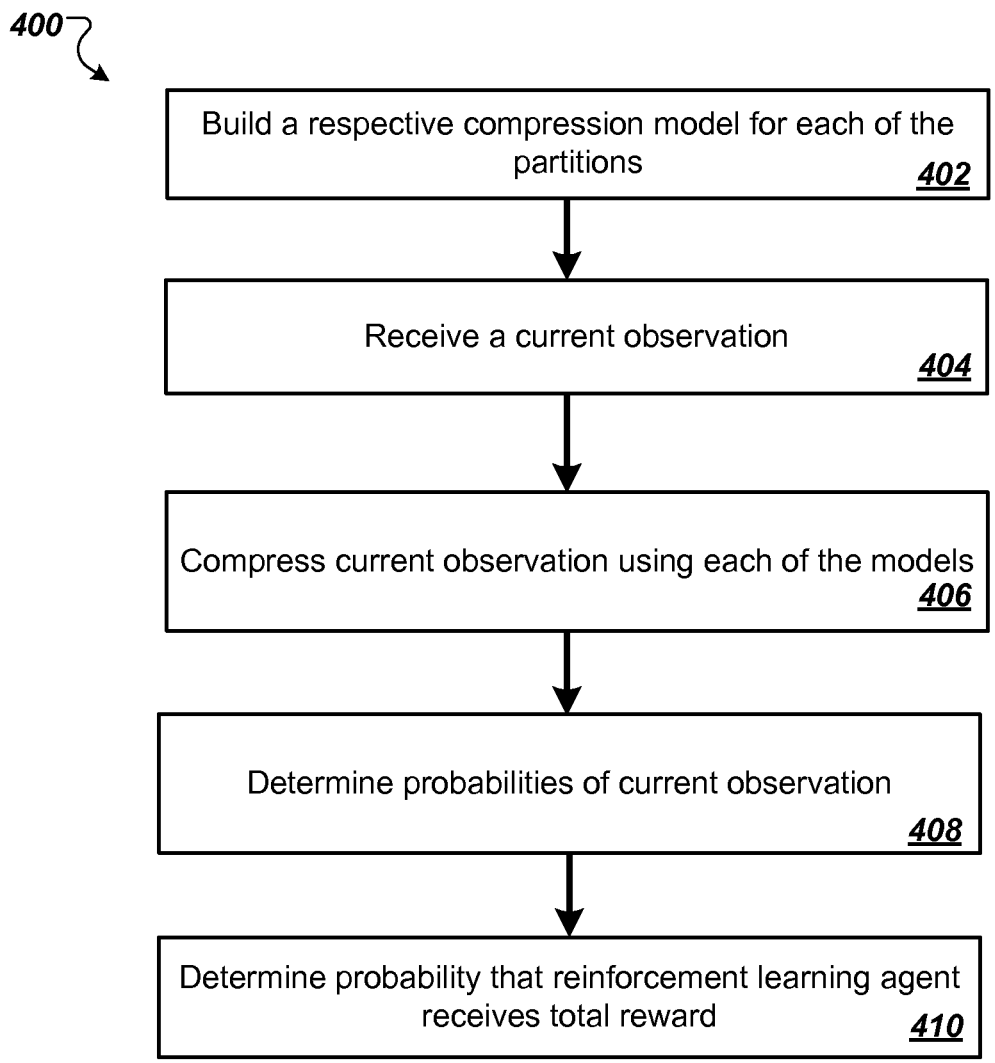
FIG. 4 is a flow diagram of an example process for determining the probability that a reinforcement learning agent receives a total reward associated with a partition if the reinforcement learning agent performs the action associated with the partition in response to receiving a current observation.

FIG. 4 is a flow diagram of an example process 400 for determining the probability that a reinforcement learning agent receives a total reward associated with a partition if the reinforcement learning agent performs the action associated with the partition in response to receiving a current observation. For convenience, the process 400 will be described as being performed by a system of one or more computers located in one or more locations. For example, a reinforcement learning system, e.g., the reinforcement learning system 100 of FIG. 1, appropriately programmed in accordance with this specification, can perform the process 400.

The system builds a respective compression model from the training observations in each of the partitions (step 402). Each compression model uses the same compression algorithm, but is built on the observations in the corresponding partition. That is, for each of the partitions, the system learns a compression model of the training observations in the partition that results in a best compression of the training observations in the partition using the compression algorithm. For example, some compression algorithms build dictionaries on the data to be compressed. For these compression algorithms, the system builds a respective dictionary for each partition using the training observations in the partition. Thus, although each compression model uses the same compression algorithm, because each model is built using different training observations, the compressed output generated by each of the models for the same input may be different.

Any of a variety of conventional compression algorithms can be used as the compression algorithm for the compression model. For example, the compression algorithm may be a Prediction by Partial Matching (PPM) algorithm. As another example, the compression algorithm may be a Context Tree Weighting (CTW) algorithm. As yet another example, the compression algorithm may be a Lempel-Ziv-Renau (LZR) algorithm.

The system receives a current observation that characterizes a current state of an environment (step 404).

The system compresses the current observation using each of the compression models to generate a set of compressed observations, with each compressed observation corresponding to a respective partition (step 406). Depending on the compression algorithm used for the compression models, the output of the compression models may be either a compressed observation or a probability that can be mapped to a compressed observation using arithmetic encoding.

The system determines, from the compressed observations and for each partition, the probability of the current observation given that the action associated with the partition was performed and the total reward was received (step 408). In particular, for the current observation $O_t$ and for a partition that is associated with a particular total reward $R_p$ and an action $a_{t+1}$, the system computes a probability $P(O_t \mid R_p; a_{t+1})$ that satisfies:

$$P(O_t \mid R_p; a_{t+1}) 2 = ^{-CL\left(O_t \mid M_{R_p, a_{t+1}}\right)},$$

where $CL(O_t \mid M_{R_p, a_{t+1}})$ is a measure of the size of the compressed observation corresponding to the partition that is associated with the particular total reward $R_p$ and an action $a_{t+1}$. The measure of the size of a compressed observation is the length, e.g., in bits, of the compressed observation. Thus, the probability of the current observation for a partition having a compression model that compressed the current observation to a smaller size than the compression model for another partition will be higher than the probability of the current observation for the other partition.

The system determines, for each total reward-action selected combination that is associated with a partition, the probability that the reinforcement learning agent receives the total reward if the reinforcement learning agent performs the action in response to receiving the current observation (step 410). In particular, for a particular total reward $R_p$ and action $a_{t+1}$, the system computes a probability $P(R_p \mid O_t; a_{t+1})$ that satisfies:

$$P(R_p \mid O_t; a_{t+1}) = \frac{P(O_t \mid R_p; a_{t+1})P(R_p; a_{t+1})}{\sum_R P(O_t \mid R; a_{t+1})P(R; a_{t+1})},$$

where the sum is a sum over all of the total rewards that are associated with the same partition as the action $a_{t+1}$, R is a given total reward, $P(R_p; a_{t+1})$ is the probability of the particular total reward-action combination and $P(R; a_{t+1})$ is the probability of the given total reward-action combination. In some implementations, the system can compute the probability of a given total reward-action combination as a ratio of the total number of observations in the partition associated with the given total reward-action combination to the total number of observations across all of the partitions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers for controlling a robot interacting with an environment, the method comprising:
    receiving a plurality of training histories for the robot, wherein the robot interacts with the environment by receiving observations characterizing states of environment and, in response to each observation, performing a respective one of a pre-determined set of actions, wherein each training history comprises, for each time step in a sequence of time steps, a respective training observation that characterizes a state of the environment at the time step and associates the training observation with an action performed by the robot at the time step and a reward received by the robot in response to performing the action;
    determining a total reward for each training observation in the training histories, wherein the total reward is a combination of rewards received by the robot subsequent to performing the action at the time step corresponding to the training observation;
    partitioning the training observations into a plurality of partitions, each partition including training observations having the same total reward and being associated with the same action;
    receiving a current observation characterizing a current state of the environment;
    determining, for each partition and from the partitioned training observations, a probability that the robot will receive the total reward for the partition if the robot performs the action for the partition in response to receiving the current observation;
    determining, from the probabilities and for each total reward, a respective estimated value of performing each action in response to receiving the current observation; and
    controlling the robot by selecting, as an action to be performed by the robot in response to the current observation, an action from the pre-determined set of actions in accordance with an action selection policy, the action selection policy including one or more rules for selecting between the actions in the pre-determined set of actions using the estimated values.

2. The method of claim 1, wherein the action selection policy specifies that an action having a highest estimated value should be selected, and wherein selecting the action comprises selecting the action having the highest estimated value.

3. The method of claim 1, further comprising:
    building a respective compression model for each of the partitions, wherein each compression model uses the same compression algorithm, and wherein building the respective compression model for each of the partitions comprises learning a compression model of the training observations in the partition that results in a best compression of the training observations in the partition using the compression algorithm.

4. The method of claim 3, wherein determining, for each partition and from the partitioned training observations, a probability that the robot will receive the total reward for the partition if the robot performs the action for the partition in response to receiving the current observation comprises:
    compressing the current observation using each of the compression models to generate a respective compressed observation for each partition;
    determining, for each of the partitions and from the compressed observations, a respective probability of the current observation given that the action performed by the robot was the action associated with the partition and the total reward received by the robot subsequent to performing the action was the total reward associated with the partition; and
    determining, for each partition, the probability that the robot will receive the total reward for the partition if the robot performs the action for the partition in response to receiving the current observation from the probabilities of the current observation.

5. The method of claim 4, wherein determining, for each of the partitions, the respective probability of the current observation comprises:
    determining a size of the compressed observation for the partition; and
    determining the probability of the current observation for the partition from the size of the compressed observation for the partition.

6. The method of claim 5, wherein the probability $P(O_t|R_p;a_{t+1})$ of the current observation for a partition that is associated with a particular total reward $R_{pc}$ and an action $a_{t+1}$ satisfies:

$$P(O_t | R_p; a_{t+1})2 = e^{-CL(O_t|M_{R_p,a_{t+1}})},$$

where $CL(O_t|M_{R_p,a_{t+1}})$ is the measure of the size of the compressed observation corresponding to the partition that is associated with the particular total reward $R_p$ and the action $a_{t+1}$.

7. The method of claim 6, wherein the probability $P(R_p|O_t;a_{t+1})$ that the robot will receive a particular total reward $R_p$ if the robot performs the action $a_{t+1}$ in response to receiving the current observation satisfies:

$$P(R_p | O_t; a_{t+1}) = \frac{P(O_t | R_p; a_{t+1})P(R_p; a_{t+1})}{\sum_R P(O_t | R; a_{t+1})P(R; a_{t+1})},$$

where the sum is a sum over all of the total rewards that are associated with the same partition as the action $a_{t+1}$, R is a given total reward, $P(R_p;a_{t+1})$ is the probability of the particular total reward-action combination and $P(R;a_{t+1})$ is the probability of the given total reward-action combination.

8. The method of claim 1, wherein the estimated value $\hat{V}_{t+1}(a_{t+1}, O_t)$ for an action $a_{t+1}$ satisfies:

$$\hat{V}_{t+1}(a_{t+1}, O_t) = \sum_R P(R \mid O_t; a_{t+1})R,$$

where the estimated value is a sum over the total rewards associated with the same partitions as the action $a_{t+1}$, R is a given total reward, and $P(R|O_t;a_{t+1})$ is the probability of receiving the given total reward if the robot performs the action $a_{t+1}$ in response to receiving the current observation $O_t$.

9. A system comprising one or more computers and one or more storage devices storing instructions that when executed by the one or more computers cause the one or more computers to perform operations for controlling a robot, the operations comprising:

receiving a plurality of training histories for the robot, wherein the robot interacts with the environment by receiving observations characterizing states of environment and, in response to each observation, performing a respective one of a pre-determined set of actions, wherein each training history comprises, for each time step in a sequence of time steps, a respective training observation that characterizes a state of the environment at the time step and associates the training observation with an action performed by the robot at the time step and a reward received by the robot in response to performing the action;

determining a total reward for each training observation in the training histories, wherein the total reward is a combination of rewards received by the robot subsequent to performing the action at the time step corresponding to the training observation;

partitioning the training observations into a plurality of partitions, each partition including training observations having the same total reward and being associated with the same action;

receiving a current observation characterizing a current state of the environment;

determining, for each partition and from the partitioned training observations, a probability that the robot will receive the total reward for the partition if the robot performs the action for the partition in response to receiving the current observation;

determining, from the probabilities and for each total reward, a respective estimated value of performing each action in response to receiving the current observation; and controlling the robot by selecting, as an action to be performed by the robot in response to the current observation, an action from the pre-determined set of actions in accordance with an action selection policy, the action selection policy including one or more rules for selecting between the actions in the pre-determined set of actions using the estimated values.

10. The system of claim 9, wherein the action selection policy specifies that an action having a highest estimated value should be selected, and wherein selecting the action comprises selecting the action having the highest estimated value.

11. The system of claim 9, the operations further comprising:

building a respective compression model for each of the partitions, wherein each compression model uses the same compression algorithm, and wherein building the respective compression model for each of the partitions comprises learning a compression model of the training observations in the partition that results in a best compression of the training observations in the partition using the compression algorithm.

12. The system of claim 11, wherein determining, for each partition and from the partitioned training observations, a probability that the robot will receive the total reward for the partition if the robot performs the action for the partition in response to receiving the current observation comprises:

compressing the current observation using each of the compression models to generate a respective compressed observation for each partition;

determining, for each of the partitions and from the compressed observations, a respective probability of the current observation given that the action performed by the robot was the action associated with the partition and the total reward received by the robot subsequent to performing the action was the total reward associated with the partition; and determining, for each partition, the probability that the robot will receive the total reward for the partition if the robot performs the action for the partition in response to receiving the current observation from the probabilities of the current observation.

13. The system of claim 12, wherein determining, for each of the partitions, the respective probability of the current observation comprises:

determining a size of the compressed observation for the partition; and determining the probability of the current observation for the partition from the size of the compressed observation for the partition.

14. The system of claim 13, wherein the probability $P(O_t|R_p;a_{t+1})$ of the current observation for a partition that is associated with a particular total reward $R_p$ and an action $a_{t+1}$ satisfies:

$$P(O_t \mid R_p; a_{t+1}) 2 = ^{-CL\left(O_t \mid M_{R_p, a_{t+1}}\right)},$$

where $CL(O_t|M_{R_p,a_{t+1}})$ is the measure of the size of the compressed observation corresponding to the partition that is associated with the particular total reward $R_p$ and the action $a_{t+1}$.

15. The system of claim 14, wherein the probability $P(R_p|O_t;a_{t+1})$ that the robot will receive a particular total reward $R_p$ if the robot performs the action $a_{t+1}$ in response to receiving the current observation satisfies:

$$P(R_p \mid O_t; a_{t+1}) = \frac{P(O_t \mid R_p; a_{t+1}) P(R_p; a_{t+1})}{\sum_R P(O_t \mid R; a_{t+1}) P(R; a_{t+1})},$$

where the sum is a sum over all of the total rewards that are associated with the same partition as the action $a_{t+1}$, R is a given total reward, $P(R_p;a_{t+1})$ is the probability of the particular total reward-action combination and $P(R;a_{t+1})$ is the probability of the given total reward-action combination.

16. The system of claim 9, wherein the estimated value $\hat{V}_{t+1}(a_{t+1}, O_t)$ for an action $a_{t+1}$ satisfies:

$$\hat{V}_{t+1}(a_{t+1}, O_t) = \sum_R P(R \mid O_t; a_{t+1})R,$$

where the estimated value is a sum over the total rewards associated with the same partitions as the action $a_{t+1}$, R is a given total reward, and $P(R|O_t;a_{t+1})$ is the probability of receiving the given total reward if the robot performs the action $a_{t+1}$ in response to receiving the current observation $O_t$.

17. A computer program product encoded on one or more non-transitory computer storage media, the computer program product comprising instructions that when executed by one or more computers cause the one or more computers to perform operations for controlling a robot, the operations comprising:

receiving a plurality of training histories for the robot, wherein the robot interacts with the environment by receiving observations characterizing states of environment and, in response to each observation, performing a respective one of a pre-determined set of actions, wherein each training history comprises, for each time step in a sequence of time steps, a respective training observation that characterizes a state of the environment at the time step and associates the training observation with an action performed by the robot at the time step and a reward received by the robot in response to performing the action;

determining a total reward for each training observation in the training histories, wherein the total reward is a combination of rewards received by the robot subsequent to performing the action at the time step corresponding to the training observation;

partitioning the training observations into a plurality of partitions, each partition including training observations having the same total reward and being associated with the same action;

receiving a current observation characterizing a current state of the environment;

determining, for each partition and from the partitioned training observations, a probability that the robot will receive the total reward for the partition if the robot performs the action for the partition in response to receiving the current observation;

determining, from the probabilities and for each total reward, a respective estimated value of performing each action in response to receiving the current observation; and controlling the robot by selecting, as an action to be performed by the robot in response to the current observation, an action from the pre-determined set of actions in accordance with an action selection policy, the action selection policy including one or more rules for selecting between the actions in the pre-determined set of actions using the estimated values.

18. The computer program product of claim 17, wherein the action selection policy specifies that an action having a highest estimated value should be selected, and wherein selecting the action comprises selecting the action having the highest estimated value.

19. The computer program product of claim 17, the operations further comprising:

building a respective compression model for each of the partitions, wherein each compression model uses the same compression algorithm, and wherein building the respective compression model for each of the partitions comprises learning a compression model of the training observations in the partition that results in a best compression of the training observations in the partition using the compression algorithm.

20. The computer program product of claim 19, wherein determining, for each partition and from the partitioned training observations, a probability that the robot will receive the total reward for the partition if the robot performs the action for the partition in response to receiving the current observation comprises:

compressing the current observation using each of the compression models to generate a respective compressed observation for each partition;

determining, for each of the partitions and from the compressed observations, a respective probability of the current observation given that the action performed by the robot was the action associated with the partition and the total reward received by the robot subsequent to performing the action was the total reward associated with the partition; and determining, for each partition, the probability that the robot will receive the total reward for the partition if the robot performs the action for the partition in response to receiving the current observation from the probabilities of the current observation.

* * * * *